(No Model.)

P. FISCHER.
Spring.

No. 237,849.        Patented Feb. 15, 1881.

Witnesses.
Chas. Wahlers.
William Miller

Inventor.
Philipp Fischer
By Van Santvoord & Hauff
Attys.

UNITED STATES PATENT OFFICE.

PHILIPP FISCHER, OF NEW YORK, N. Y., ASSIGNOR TO GEORGE NICOLAIE, OF SAME PLACE.

SPRING.

SPECIFICATION forming part of Letters Patent No. 237,849, dated February 15, 1881.

Application filed December 23, 1880. (No model.)

*To all whom it may concern:*

Be it known that I, PHILIPP FISCHER, a citizen of the United States, residing at New York, in the county and State of New York, have invented new and useful Improvements in Springs, of which the following is a specification.

This invention consists in the combination, in a spring, of two semi-elliptical leaves, which are fastened together at their ends, a rectilinear spring extending between the semi-elliptical leaves and connected to their ends, a rod fastened to the middle of one of the semi-elliptical leaves and extending through the second leaf, a stop secured to said rod, and a spring placed into a cage secured to the second leaf and surrounding the stop-rod, so that when the two semi-elliptical leaves are compressed the rectilinear spring is expanded and its force is added to that of the semi-elliptical leaves, and if the compression of these semi-elliptical leaves reaches a certain point the stop-rod acts upon its spring, and the force of this spring is added to that of the semi-elliptical leaves and of the rectilinear spring, and at the same time said stop-rod prevents the semi-elliptical leaves from being compressed beyond the desired limit.

Figure 1:
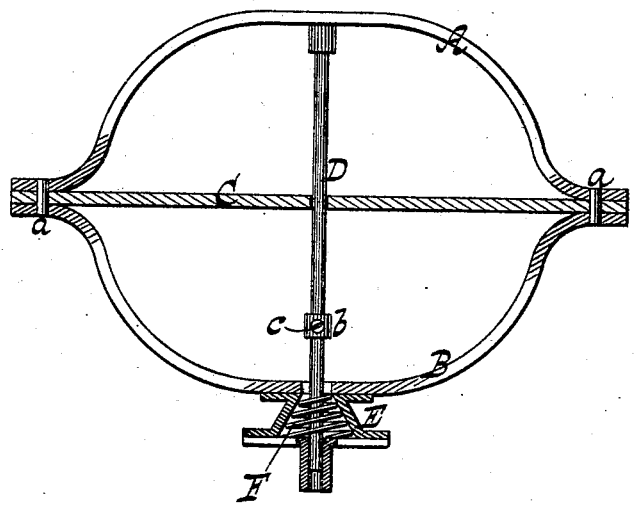
Figure 2:
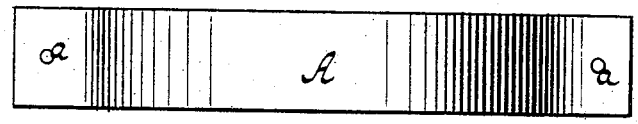

This invention is illustrated in the accompanying drawings, in which Figure 1 represents a sectional side view. Fig. 2 is a plan or top view.

Similar letters indicate corresponding parts.

In the drawings, the letter A designates a semi-elliptical leaf, made of spring-steel and bent as shown in Fig. 1. With this leaf is combined a second leaf, B, formed like the first leaf, A, and secured to the same at its ends by rivets or bolts *a*.

The ends of the two semi-elliptical leaves A B are connected by a rectilinear spring, C, which may consist of a strip of india-rubber, as shown, or which may be made in the form of a spiral spring. If the two semi-elliptical leaves are compressed the rectilinear spring C is expanded and its force is added to that of the semi-elliptical leaves.

To the middle of the first leaf, A, is firmly secured a rod, D, which extends at right angles to the rectilinear spring C, and through a hole in the middle of the second leaf, B. To this second leaf is secured a cage, E, which incloses a spiral spring, F, surrounding the rod D. The end of this rod passes through and is guided in the bottom of the cage E.

On the rod D is secured a stop, *b*, which can be adjusted by a set-screw, *c*, and which, when the semi-elliptical leaves A B are compressed to a sufficient degree, acts upon the spiral spring F, so that, in addition to the force of the leaves A B and of the rectilinear spring C, the force of the spiral spring E is brought into action. The stop *b* also prevents the semi-elliptical leaves from being compressed beyond the desired limit. The rod D also serves to prevent my spring from swaying in the direction of its length. By these means a spring is obtained which is capable of sustaining a considerable weight and which can be used with great advantage for carriages, wagons, railroad-cars, and also for other purposes.

What I claim as new, and desire to secure by Letters Patent, is—

1. The combination, with two semi-elliptical spring-leaves having their ends secured together, the horizontal rectilinear spring having its ends connected with the ends of the semi-elliptical springs, and a vertical rod rigidly connected with the upper spring and passing loosely through openings in the other springs, all substantially as shown and described.

2. The combination, in a spring, of two semi-elliptical leaves, A B, fastened together at their ends, a rod, D, fastened to the first leaf and extending through the second leaf, B, a stop, *b*, fastened on said rod, and a spring, E, contained in a cage secured to the second leaf, B, and surrounding the rod D, substantially as and for the purpose described.

3. The combination, in a spring, of two semi-elliptical leaves, A B, fastened together at their ends, a rectilinear spring, C, extending between said semi-elliptical leaves and fastened to their ends, a rod, D, fastened to the first leaf, A, and extending through the second leaf, B, a stop, *b*, fastened on said rod, and a spring, E, contained in a cage secured to the second leaf, B, all constructed to operate substantially as and for the purpose set forth.

In testimony whereof I have hereunto set my hand and seal in the presence of two subscribing witnesses.

PHILIPP FISCHER. [L. S.]

Witnesses:
W. HAUFF,
CHAS. WAHLERS.